US012242231B2

(12) United States Patent
Lagorgette

(10) Patent No.: US 12,242,231 B2
(45) Date of Patent: Mar. 4, 2025

(54) METHOD FOR SETTING AN ELECTRONIC WATCH

(71) Applicant: ETA SA MANUFACTURE HORLOGÈRE SUISSE, Grenchen (CH)

(72) Inventor: Pascal Lagorgette, Bienne (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 903 days.

(21) Appl. No.: 17/102,823

(22) Filed: Nov. 24, 2020

(65) Prior Publication Data

US 2021/0191340 A1 Jun. 24, 2021

(30) Foreign Application Priority Data

Dec. 18, 2019 (EP) .................................... 19217405

(51) Int. Cl.
*G04R 20/26* (2013.01)

(52) U.S. Cl.
CPC .................................... *G04R 20/26* (2013.01)

(58) Field of Classification Search
CPC ...................................................... G04R 20/26
See application file for complete search history.

(56) References Cited

U.S. PATENT DOCUMENTS

2015/0078138 A1* 3/2015 Ito ...................... H04N 21/2542 368/9
2015/0372721 A1* 12/2015 Bard .................... H04B 1/3888 455/575.8
2016/0266606 A1* 9/2016 Ricci ....................... G06F 1/163
(Continued)

FOREIGN PATENT DOCUMENTS

| | | | | |
|---|---|---|---|---|
| CH | 712 176 | A2 | 8/2017 | |
| CN | 110324474 | A | 10/2019 | |
| EP | 1553469 | A1 | 7/2005 | |
| EP | 3211491 | A1 * | 8/2017 | ............. G04D 7/004 |
| EP | 3 249 475 | A1 | 11/2017 | |
| JP | 2004-93557 | A | 3/2004 | |

(Continued)

OTHER PUBLICATIONS

European Search Report for EP 19 21 7405 dated May 6, 2020.
(Continued)

*Primary Examiner* — Edwin A. Leon
*Assistant Examiner* — Jason M Collins
(74) *Attorney, Agent, or Firm* — Sughrue Mion, PLLC

(57) ABSTRACT

A method for setting an electronic watch including a near-field communication module and a microcontroller configured to exchange electric signals with this module, the method including: establishing a near-field connection between the electronic appliance and the watch; verifying, by way of the microcontroller of the electronic appliance, the accuracy of a datum indicating the clock state of the watch; sending, to the near-field communication module of the watch, by way of the near-field communication device and when instructed to do so by the microcontroller of the electronic appliance, at least one watch setting instruction when the clock state datum is inaccurate; processing said at least one instruction received by means of the microcontroller of the watch, in order to generate watch setting parameters; and configuring the watch when instructed to do so by the microcontroller of the watch, according to the setting parameters generated.

8 Claims, 1 Drawing Sheet

(56) References Cited

U.S. PATENT DOCUMENTS

| | | | | |
|---|---|---|---|---|
| 2017/0255170 | A1 | 9/2017 | Morohoshi et al. | |
| 2018/0246473 | A1 | 8/2018 | Hanada et al. | |
| 2019/0049904 | A1* | 2/2019 | Lagorgette ............. | G04R 20/26 |

FOREIGN PATENT DOCUMENTS

| | | | |
|---|---|---|---|
| JP | 2018-081100 | A | 5/2018 |
| JP | 2018-195256 | A | 12/2018 |

OTHER PUBLICATIONS

Communication dated Nov. 9, 2021 from the China National Intellectual Property Administration in CN Application No. 202011503238.8.

* cited by examiner

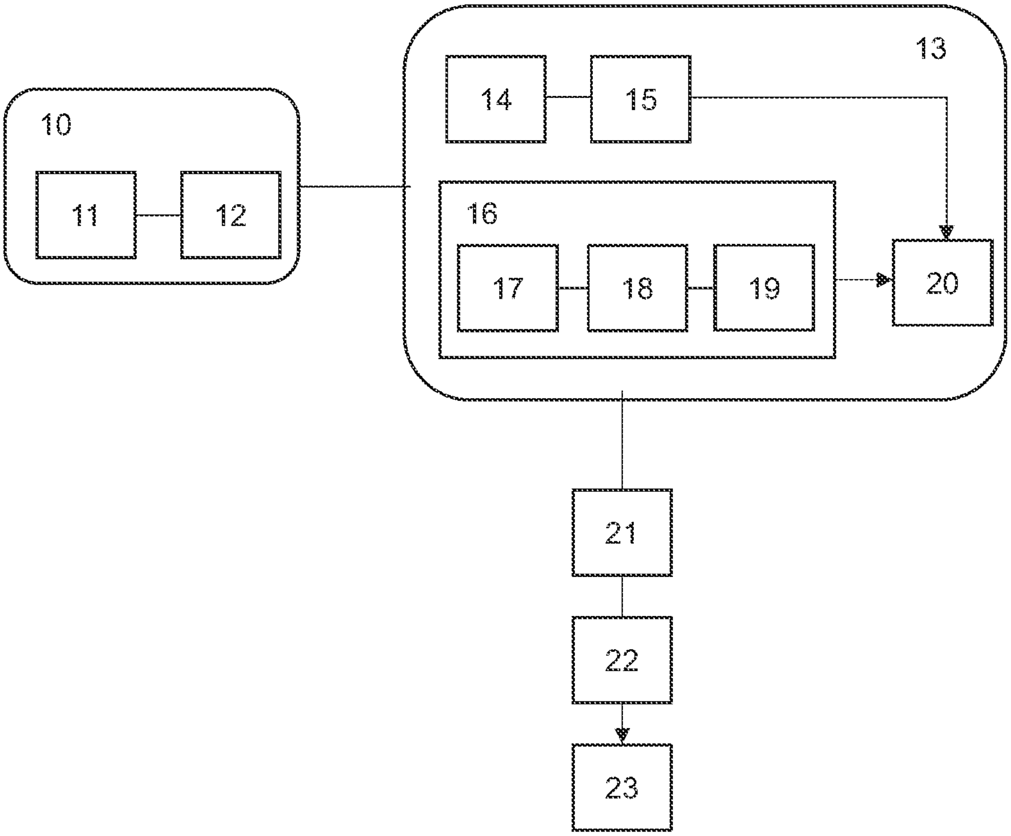
10
11
12
13
14
15
16
17
18
19
20
21
22
23

METHOD FOR SETTING AN ELECTRONIC WATCH

CROSS REFERENCE TO RELATED APPLICATION

This application claims priority to European Patent Application No. 19217405.0 filed Dec. 18, 2019, the entire contents of which are incorporated herein by reference.

TECHNICAL FIELD

The present invention relates to the technical field of electronic watches. The invention more particularly relates to a method for setting an electronic watch, for example a quartz watch.

PRIOR ART

So-called "smart" watches, capable of communicating with an electronic appliance such as a smartphone, have emerged in the watchmaking sector in recent years. Such a watch can be set manually, in particular by activating push buttons, crowns and/or tactile keys, which is relatively inconvenient for the user or the after-sales service responsible for the setting operation. For example, if the watch has a perpetual calendar mechanism, the position of the analogue display elements of the perpetual calendar mechanism, and more generally the perpetual calendar mechanism, can be set by pulling on and/or rotating a crown of the watch and/or by pressing one or more push buttons of the watch. Thus, a type of year (for example a bissextile year) is selected, and the various display elements, and more generally all of the elements of the perpetual calendar mechanism, are positioned correctly. This method is not only tedious for the user, who has to correctly recall and execute all of the setting operations one after another, but it furthermore leads to risks of errors and discrepancies.

It is understood that there is a need to find a solution, in particular that overcomes the drawbacks of the prior art.

SUMMARY OF THE INVENTION

The purpose of the present invention is to overcome these drawbacks by proposing a method for setting a mechanism carrying out a clock function such as the perpetual calendar function of an electronic watch such as a quartz watch, which method is simple, robust and reliable.

For this purpose, the invention relates to a method for setting an electronic watch, the watch comprising a near-field communication module and a microcontroller configured to exchange electric signals with this module, the method being carried out by means of a portable electronic appliance comprising a near-field communication device and a microcontroller configured to control said device, the method comprising the following steps of:

- establishing a near-field connection between the electronic appliance and the watch;
- verifying, by way of the microcontroller of the electronic appliance, the accuracy of a datum indicating the clock state of the watch;
- sending, to the near-field communication module of the watch, by way of the near-field communication device and when instructed to do so by the microcontroller of the electronic appliance, at least one watch setting instruction when the clock state datum is inaccurate;
- processing said at least one instruction received by means of the microcontroller of the watch, in order to generate watch setting parameters; and
- configuring the watch when instructed to do so by the microcontroller of the watch, according to the setting parameters generated.

This method has the advantage of being capable of being implemented without the user having to carry out any complex setting operation using crowns, push buttons or tactile keys for example. The method can require being initiated, which can take place either manually by pressing a push button or a touch-sensitive screen of the watch or of the electronic appliance, or automatically when the watch and the electronic appliance are close to one another.

This method also has the advantage of requiring very little hardware: a portable appliance of the smartphone type with a suitable mobile application is sufficient to implement said method. The method does not require the use of dedicated hardware such as a sensor to be connected to a computer, nor does it require the use of bulky hardware. Anyone (for example a watchmaker) in possession of a smartphone can implement the method.

In other embodiments:

- the step of establishing a connection comprises, when the communication module of the watch is situated on the movement of the watch, on the side nearest the back, a sub-step of removing the back of the watch case to reveal the communication module of the watch;
- the step of establishing a connection comprises a sub-step of initiating a connection between the watch and the electronic appliance when this watch is located with respect to the electronic appliance at a distance allowing a connection to be established;
- the step of establishing a connection comprises a sub-step of automatically initiating a connection between the watch and the electronic appliance when this watch is located with respect to the electronic appliance at a distance allowing a connection to be established;
- the verification step comprises a sub-step of transmitting, to the communication module of the watch, by way of the near-field communication device and when instructed to do so by the microcontroller of the electronic appliance controlling said communication device, an instruction for retrieving the datum indicating the clock state of the watch;
- the verification step comprises, after receiving the instruction for retrieving the datum indicating the clock state of the watch, a sub-step of sending, to the electronic appliance, by way of the near-field communication module when instructed to do so by the microcontroller of the watch, the clock state datum characterising a current setting of the watch;
- the verification step comprises a sub-step of determining the clock state datum from a process of reading a dial of the watch carried out by the electronic appliance comprising a camera and an optical recognition algorithm executed by the microcontroller of the electronic appliance, the sub-step comprising a phase of placing the dial of the watch and the camera of the electronic appliance such that they face one another;
- the verification step comprises a sub-step of determining the clock state datum from a process of reading a dial of the watch carried out by the electronic appliance comprising a camera and an optical recognition algorithm executed by the microcontroller of the electronic appliance, the sub-step comprising, using the camera and the optical recognition algorithm of the electronic appliance, a phase of detecting information displayed on the dial characterising a current setting of the watch;
- the verification step comprises a sub-step of determining the clock state datum from a process of reading a dial of the watch carried out by the electronic appliance comprising a camera and an optical recognition algorithm executed by the microcontroller of the electronic appliance, the sub-step comprising a phase of estimating the clock state datum based on the information detected;
- the verification step comprises a sub-step of comparing the state data with setting parameters;
- the watch including a perpetual calendar mechanism and means for positioning elements of said mechanism, the microcontroller of the watch being configured to control said positioning means, the configuration step comprising actuating the means for positioning the elements of the perpetual calendar mechanism so as to position said elements in a position that corresponds to the setting parameters; and
- the electronic appliance being a smartphone.

The invention further relates to a system for setting the electronic watch implementing the method according to any of the preceding claims, the system comprising a portable electronic appliance provided with a near-field communication device and a microcontroller configured to control said device, the watch comprising a near-field communication module and a microcontroller configured to exchange electric signals with this module, said watch and said appliance being configured to be connected, in the near field, with one another to carry out the setting operation for the watch.

BRIEF DESCRIPTION OF THE FIGURES

The purposes, advantages and features of the invention will appear more clearly upon reading the following detailed description of at least one embodiment of the invention, which is provided as a non-limiting example and illustrated in FIG. 1, which diagrammatically shows steps of the method for setting an electronic watch such as a quartz watch.

DETAILED DESCRIPTION OF ONE EMBODIMENT

In one embodiment shown in FIG. 1, the invention relates to a method for setting an electronic watch such as a quartz watch, from a portable or mobile electronic appliance. In other words, this watch and the portable electronic appliance allow such a method to be implemented. Such a method is capable of setting a mechanism providing a clock function such as the perpetual calendar of a quartz watch. These clock functions can also comprise the current date, day, month or year, or the current lunar phase, etc.

This method is implemented by a system for setting a watch comprising a portable electronic appliance which is capable of connecting to said watch via near-field communication technology. In this context, this watch of the system thus comprises, in a non-limiting and non-exhaustive manner:
- a near-field communication module, in particular a shielded near-field communication module as described hereinbelow;
- a microcontroller configured to exchange electric signals with the near-field communication module;
- a regulating member such as a quartz oscillator for providing a time base to the microcontroller and also for actuating one or more stepping motors to rotate time display hands and analogue display elements of a mechanism of a clock function of the watch such as the perpetual calendar;
- a case that is closed on either side by a dial and a back of the watch;
- a bracelet mounted on the case;
- an analogue display thus comprising hands, in particular three time display hands for respectively displaying the hours, minutes and seconds;
- a perpetual calendar mechanism;
- an input interface such as a touch-sensitive screen or even push buttons, or a crown, etc.
- a power supply unit such as a cell or a battery in particular for powering the microcontroller.

In this watch, the perpetual calendar mechanism comprises a set of elements, including elements for displaying the date, day and month. The display elements are preferably analogue display elements and comprise, for example, two hands to indicate the day and the month, and a disc to indicate the date. It is thus understood that these display elements allow the date, the day, the month and optionally the lunar phase to be indicated, while automatically taking into account the different lengths of the months and bissextile years. More specifically, a display element such as a hand is used to point to a date, day, month or lunar phase indication inscribed on the dial of the watch, or a display element such as a disc on which date, day, month or lunar phase indications are inscribed, one of these indications being positioned facing an aperture in the dial.

The microcontroller of this watch is capable of controlling means for positioning the elements of the perpetual calendar mechanism, in particular these display elements. The means for positioning the elements of the perpetual calendar mechanism advantageously comprise one or more stepping motors. The microcontroller is furthermore connected to control means, or an input interface, which can be a crown, push pieces or touch-sensitive areas, which can be directly actuated by the wearer of the watch. Moreover, the near-field communication module which is connected to the microcontroller can be positioned:
- on the movement of the watch, on the back side;
- on a visible top face of a dial of this watch ora bottom face of this dial, in particular by being arranged in a cavity made in this dial;
- on a visible top face of a flange of the watch or a bottom face of this flange, in particular by being arranged in a cavity made in this flange;
- in the thickness of this dial;
- between the horns (towards the bracelet), or on the side of the middle, behind a sealed non-metallic element; and
- in or on a bezel of this watch.

The portable electronic appliance is an electronic appliance, also known as a user terminal, that is capable of being carried and transported by a user, and of being functional during the transport thereof. This is the case for a smartphone, a phablet or a tablet for example. It goes without saying that the appliances requiring a mains power supply, for example desktop computers, do not fall within the scope of this definition. Groups of appliances, for example a portable computer, to which a sensor is connected by a wireless or wired link, also do not fall within the scope of this definition. This electronic appliance is used to transmit the setting parameters to the watch. This electronic appliance comprises a case in which an electronic circuit is arranged. This electronic circuit includes a microcontroller and a near-field communication device, both of which are powered by a battery. The electronic appliance can further comprise a camera and an input interface such as a touch-sensitive screen or even buttons. Moreover, the microcontroller can include, in the memory elements thereof, an optical recognition algorithm to contribute to detecting information in particular displayed on the dial of the watch from an operation for processing data originating from the camera.

The near-field communication module and device implement, for example, wireless short-range, high-frequency communication technologies of the NFC (Near Field Communication) type. This communication module and device can, for example, operate in frequency bands at high frequencies HF for example at 13.56 MHz.

This communication module and device thus allow data to be exchanged when the watch and the electronic appliance are at a short distance from one another. Such a distance can lie in the range of about 0 to 10 cm, and preferably in the range 0 to 5 cm. The communication module of the watch can be of the passive type with power supplied thereto by the radio frequencies emitted by the communication device of the electronic appliance.

More specifically, the near-field communication module and device each comprise an electronic chip and at least one antenna. The chip that is connected to said at least one antenna comprises hardware and software elements. In this context, the hardware and/or software elements of the chip more specifically include at least one microprocessor cooperating with memory elements. The communication module and device each comprise a support element, such as a plastic or laminate composite substrate, on which the chip and said at least one antenna are bonded.

It should be noted that the communication module of the watch can comprise a magnetic shield element comprised in the support element or between this element and the part of the watch where it is to be mounted. This magnetic shield element improves the efficiency and sensitivity of the receipt/transmission of radio signals via the antenna of the communication module by isolating said at least one antenna from the metallic components of the watch located in the immediate vicinity thereof. In other words, this magnetic shield element prevents any modification to the magnetic field emitted or received by the communication module, which modification would be the result of the presence of various metallic components of the watch situated in the immediate vicinity of the communication module. Additionally, it is capable of reducing the negative influence that these metallic components can have on the performance levels of the communication module. This negative influence would consist of attenuating the magnetic field generated or received by this communication module.

In this context, the method allowing the watch to be set is implemented by the setting system comprising the electronic appliance and the watch. It in particular allows a perpetual calendar mechanism of this watch to be set by positioning the display elements of said mechanism. In the context of setting this perpetual calendar mechanism, this can be referred to as a method for setting a perpetual calendar mechanism of the quartz watch.

This method comprises a step 10 of establishing a near-field connection between the electronic appliance and the watch. The term "near field" is understood herein to mean that the connection is made using NFC (Near Field Communication) technology and insofar as the distance separating the electronic appliance from the watch lies in the range 0 to 10 cm, preferably in the range 0 to 5 cm. This step 10 comprises, when the communication module of the watch is situated on the movement of the watch, on the side nearest the back, a sub-step 11 of removing the back of the watch case to reveal the communication module of the watch. This back of the quartz watch case is generally removable in order to be able to change the power supply unit of this watch.

However, this sub-step 11 is not compulsory and is not carried out for example if:

- the back has a transparent portion or is made of a partially transparent material, or
- the back is non-metallic, or
- the communication module is arranged on a transparent portion of the back of the watch, or
- the communication module of the watch is arranged, for example:
  - in a bezel of the watch;
  - between the horns (towards the bracelet), or on the side of the middle, behind a sealed non-metallic element;
  - in or on a dial of the watch; and/or
  - in or on a flange of this watch.

Then, this step 10 of establishing a connection comprises a sub-step 12, which is in particular automatic, of initiating a connection between the watch and the electronic appliance when this watch is located with respect to the electronic appliance at a distance allowing a near-field connection to be established. In other words, such a sub-step 12 can be initiated manually or automatically.

When this sub-step 12 is carried out manually, it is referred to as a sub-step 12 of manually initiating a connection between the watch and the electronic appliance when this watch is located with respect to the electronic appliance at a distance allowing a near-field connection to be established. In this context, the watch and the electronic appliance are arranged relative to one another at a distance that allows a near-field connection to be established. Then, the communication module of the watch initiates a connection process with the communication device of the electronic appliance, or the communication device of the electronic appliance initiates this connection process with the communication module of the watch, after an interaction, depending on the case, between the user and an input interface of the watch, or between the user and an input interface of the electronic appliance.

When this sub-step 12 is carried out automatically, simply positioning the watch relative to the electronic appliance at a distance allowing a near-field connection to be established is sufficient to initiate the connection process between the communication module of the watch and the communication device of the electronic appliance. In this context, this is referred to as a sub-step 12 of automatically initiating a connection between the watch and the electronic appliance when this watch is located with respect to the electronic appliance at a distance allowing a connection to be established. In this configuration, this sub-step 12 thus contributes to establishing an automatic connection, without requiring the user to perform any actions on the watch or the electronic appliance, between this watch and the electronic appliance in addition to automatically setting the clock functions of this watch in a transparent manner for this user of said watch. It should be noted that this sub-step 12 can comprise an authentication phase taking place between the communication device and module which is transparent for the user. In other words, such an authentication phase does not require the user to perform any actions. In this context, authentication elements are included in the memory elements of the communication device and module.

Once the connection has been established between the watch and the electronic appliance, the method comprises a step 13 of verifying, by way of the microcontroller of the electronic appliance, the accuracy of a datum indicating the clock state of the watch. Such a clock state datum is a datum that represents an at least partial setting state of the watch. It can, for example, be a time zone, a country code, an alarm, a geographic location, a date, a tide, a solar phase or a lunar phase, a UTC time, etc. set on the watch. In the case that the method aims to set said perpetual calendar mechanism, the state datum can pertain to the current date, day, month or year (or even the current lunar phase if the perpetual calendar mechanism comprises an element for displaying the lunar phase, for example a datum regarding the geographic location, the hemisphere, the country code, etc.), said state datum representing a current setting state of the perpetual calendar mechanism, for example a position of a display element of said mechanism.

Such a verification step 13 comprises a sub-step 14 of transmitting, to the communication module of the watch, by way of the near-field communication device and when instructed to do so by the microcontroller of the electronic appliance controlling said communication device, an instruction for retrieving the datum indicating the clock state of the watch. During this sub-step 14, a signal regarding said instruction is thus generated by the microcontroller to be transmitted to this communication device. The communication device then transmits this instruction to the communication module of the watch.

Then, the verification step 13 comprises, after the watch receives this instruction, a sub-step 15 of sending, to the electronic appliance, by way of the near-field communication module when instructed to do so by the microcontroller of the watch, the clock state datum characterising a current setting of the watch corresponding to current setting parameters of this watch. During this sub-step 15, the microcontroller determines the clock state datum characterising a current setting of a mechanism relative to a clock function such as the perpetual calendar. In the context of the perpetual calendar, the state datum relates to the current date, day, month and year (and optionally to the current lunar phase if the perpetual calendar mechanism comprises an element for displaying the lunar phase, for example data regarding a geographical location, a hemisphere or a country code, etc.). This state datum is sufficient to represent a current setting state of the perpetual calendar mechanism, in particular the position of the display elements of said mechanism. The microcontroller then generates a signal comprising this clock state datum which is transmitted to the communication module. The communication module of the watch then sends said state datum to the communication device.

In an alternative embodiment of this transmitting sub-step 14 and sending sub-step 15, the verification step 13 can provide for a sub-step 16 of determining the clock state datum from a process involving reading a dial of the watch, carried out by the electronic appliance comprising the camera and an optical recognition algorithm executed by the microcontroller of the electronic appliance. Such a sub-step 16 thus comprises a phase 17 designed to place the dial of the watch and the camera of the electronic appliance such that they face one another. The term "facing one another" is understood to mean that the dial and the camera are positioned relative to one another and at a distance from one another such that the hands of the time display lie within the image capture field of the camera. This sub-step 16 then comprises a phase 18 of detecting information characterising a current setting of the watch, which is displayed on the dial of this watch, by means of the camera and the optical recognition algorithm of the electronic appliance. This sub-step 16 then comprises a phase 19 of estimating the clock state datum based on the information detected. This state datum can, in this case, further characterise a current setting of the perpetual calendar mechanism.

The verification step 13 then comprises a sub-step 20 of comparing the state data with setting parameters, in order to verify that the setting of the perpetual calendar mechanism is correct. These setting parameters are, for example, retrieved on a regular basis or upon request, over an Internet network, from the electronic appliance. The term "setting parameter" is understood to mean any parameter allowing the watch to be at least partially set. It can be, for example, information concerning a date as shown, but also information that could concern a time zone, a country code, an alarm, a geographical location, a date, a tide, a solar phase or a lunar phase, or a UTC time, etc. It should be noted that when this is a setting parameter of the perpetual calendar mechanism, this is understood to mean information regarding the current date, day, month and year (and optionally the current lunar phase if the perpetual calendar mechanism comprises an element for displaying the lunar phase, this data thus being, for example, a geographical location, a hemisphere, or a country code, etc.), this information being sufficient to correctly set the perpetual calendar mechanism of the watch, in particular the position of the display elements of this mechanism.

The method then comprises a step 21 of sending at least one setting instruction to the near-field communication module of the watch. This setting instruction is sent by the near-field communication device when instructed to do so by the microcontroller of the electronic appliance, as soon as the clock state datum is identified/estimated to be inaccurate. During this step 21, a control signal regarding said setting instruction is generated by the microcontroller and then transmitted to the communication device of the electronic appliance. This control signal is such that it corresponds to a coding of setting parameters of the perpetual calendar mechanism, i.e. a coding of a set of data relative to the current date, day, month and year (and also to the lunar phase where appropriate). As stated hereinabove, such setting parameters are, for example, retrieved on a regular basis or upon request, over an Internet network, from the electronic appliance. It should be noted that, in order to perform the coding, a dedicated application installed on the electronic appliance is advantageously used. If the electronic appliance is a smartphone or a tablet, this application is advantageously capable of generating the coding from the date, day, month, year and geographical location provided by the electronic appliance. This setting instruction is then transmitted by the communication device to the communication module of the watch.

The method then comprises a step 22 of processing said at least one instruction received by means of the microcontroller of the watch, in order to generate watch setting parameters. During this step 22, the microcontroller processes said instruction to obtain the current perpetual date.

The method then includes a step 23 of configuring the watch when instructed to do so by the microcontroller of the watch, according to the setting parameters generated. During this step 23, when instructed by the microcontroller of the watch, this step 23 is designed to actuate means for positioning the elements of the perpetual calendar mechanism so as to place said elements in a position that corresponds to the setting parameters obtained during the processing step 22.

It is understood that various modifications and/or improvements and/or combinations that would be obvious to a person skilled in the art can be made to the embodiment of the invention described hereinabove, while still remaining within the scope of the invention as defined by the accompanying claims. For example, the verification step 13 could be omitted, with the user converting the position of the time display hands into workable data.

Moreover, although the description describes the setting and verification of the setting of a perpetual calendar mechanism, other settings could alternatively be carried out, for example setting a time zone, a time, or tides etc. Moreover, this set information is not necessarily displayed on the watch in an analogue manner (in particular by hands or discs), but can be displayed in a digital manner on the dial: the configuration step 23 thus does not necessarily include activating means for displacing analogue display elements.

The invention claimed is:

1. A method for setting an electronic watch, the watch comprising a near-field communication module and a microcontroller configured to exchange electric signals with this module, the method being carried out by means of a portable electronic appliance comprising a near-field communication device and a microcontroller configured to control said device, the method comprising the following steps of:

establishing a near-field connection between the electronic appliance and the watch, the near-field connection being established by removal of a back-case from a back portion of the watch and alignment of the back portion of the watch to face the electronic appliance, the back portion of the watch being a part of the watch facing a direction opposite to that of a face of the watch through which a mechanical dial and numerical indicators of a perpetual calendar of the watch are visible, and the dial and the numerical indicators of the perpetual calendar are not visible through the back portion of the watch;

verifying, by way of the microcontroller of the electronic appliance, the accuracy of a datum indicating the clock state of the watch;

sending, to the near-field communication module of the watch, by way of the near-field communication device and when instructed to do so by the microcontroller of the electronic appliance, at least one watch setting instruction when the clock state datum is inaccurate;

processing said at least one instruction received by means of the microcontroller of the watch, in order to generate watch setting parameters; and configuring the watch when instructed to do so by the microcontroller of the watch, according to the setting parameters generated, wherein the verification step comprises a sub-step of transmitting, to the communication module of the watch, by way of the near-field communication device and when instructed to do so by the microcontroller of the electronic appliance controlling said communication device, an instruction instructing the watch to retrieve and transmit to the electronic appliance the datum indicating the clock state of the watch, wherein verifying the accuracy of the datum, sending the at least one watch setting, and configuring the watch all occur while both the face of the watch is facing away from the electronic device and the back portion of the watch is facing the electronic device, and wherein the step of establishing a connection comprises a sub-step of automatically initiating a connection between the watch and the electronic appliance when it is detected that the watch is located with respect to the electronic appliance at a distance allowing a connection to be established.

2. The setting method according to claim 1, wherein the step of establishing a connection comprises, when the communication module of the watch is situated on the movement of the watch, on the side nearest the back, a sub-step of removing the back of the watch case to reveal the communication module of the watch.

3. The setting method according to claim 1, wherein the step of establishing a connection comprises a sub-step of initiating a connection between the watch and the electronic appliance when this watch is located with respect to the electronic appliance at a distance allowing a connection to be established.

4. The setting method according to claim 1, wherein the verification step comprises, after receiving the instruction for retrieving the datum indicating the clock state of the watch, a sub-step of sending, to the electronic appliance, by way of the near-field communication module when instructed to do so by the microcontroller of the watch, the clock state datum characterising a current setting of the watch.

5. The setting method according to claim 1, wherein a verification step comprises a sub-step of comparing the state data with setting parameters.

6. The setting method according to claim 1, the watch including a perpetual calendar mechanism and means for positioning elements of said mechanism, the microcontroller of the watch being configured to control said positioning means, the configuration step comprising actuating the means for positioning the elements of the perpetual calendar mechanism so as to position said elements in a position that corresponds to the setting parameters.

7. The setting method according to claim 1, the electronic appliance being a smartphone.

8. A system for setting the electronic watch implementing the method according to claim 1, the system comprising a portable electronic appliance provided with a near-field communication device and a microcontroller configured to control said device, the watch comprising a near-field communication module and a microcontroller configured to exchange electric signals with this module, said watch and said appliance being configured to be connected, in the near field, with one another to carry out the setting operation for the watch.

* * * * *